US009451292B2

(12) United States Patent
Miller et al.

(10) Patent No.: US 9,451,292 B2
(45) Date of Patent: Sep. 20, 2016

(54) METHOD AND SYSTEM FOR BACKWARD COMPATIBLE, EXTENDED DYNAMIC RANGE ENCODING OF VIDEO

(75) Inventors: Jon Scott Miller, Harleysville, PA (US); Mahdi Nezamabadi, I, Moorestown, NJ (US); Craig Todd, Mill Valley, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 300 days.

(21) Appl. No.: 14/344,150

(22) PCT Filed: Aug. 31, 2012

(86) PCT No.: PCT/US2012/053508
§ 371 (c)(1),
(2), (4) Date: Mar. 11, 2014

(87) PCT Pub. No.: WO2013/039730
PCT Pub. Date: Mar. 21, 2013

(65) Prior Publication Data
US 2014/0341272 A1 Nov. 20, 2014

Related U.S. Application Data

(60) Provisional application No. 61/535,251, filed on Sep. 15, 2011.

(51) Int. Cl.
*H04N 19/98* (2014.01)
*H04N 5/202* (2006.01)
(Continued)

(52) U.S. Cl.
CPC .............. *H04N 19/98* (2014.11); *H04N 5/202* (2013.01); *H04N 5/57* (2013.01); *H04N 19/46* (2014.11)

(58) Field of Classification Search
None
See application file for complete search history.

(56) References Cited

U.S. PATENT DOCUMENTS 6,707,459 B1  3/2004  Graves
7,580,081 B2  8/2009  Tamano
(Continued)

FOREIGN PATENT DOCUMENTS

EP  2503784  9/2012
JP  WO 2011061954 A1 *  5/2011  ........... H04N 1/6058
WO  2011/061954  5/2011

OTHER PUBLICATIONS

Barten, Peter G.J. "Formula for the Contrast Sensitivity of the Human Eye" Proc. SPIE, Image Quality and System Performance, 2004, vol. 5294, pp. 231-238.
(Continued)

*Primary Examiner* — Christopher S Kelley
*Assistant Examiner* — Kaitlin A Retallick

(57) ABSTRACT

In some embodiments, an encoding method for generating an extended dynamic range (EDR) channel in response to an input video channel, such that the EDR channel's code values consist of code values in a range from a standard black level, X, through a standard white level, Z, and an additional code value set. The EDR channel is displayable with standard dynamic range and standard precision by a standard dynamic range video system which maps to the level, X, any of the EDR channel's values less than X, and maps to the level, Z, any of the EDR channel's values greater than Z, and is displayable with an extended dynamic range greater than the standard dynamic range and/or a precision greater than the standard precision by an EDR video system. Other aspects are systems configured to perform embodiments of the encoding method, and methods and systems for displaying EDR video.

7 Claims, 1 Drawing Sheet

(51) Int. Cl.
*H04N 5/57* (2006.01)
*H04N 19/46* (2014.01)

(56) References Cited

U.S. PATENT DOCUMENTS

| | | | |
|---|---|---|---|
| 8,537,893 B2 | 9/2013 | Efremov | |
| 2005/0286870 A1 | 12/2005 | Owada | |
| 2006/0104508 A1* | 5/2006 | Daly | G06T 5/009 |
| | | | 382/167 |
| 2007/0030384 A1 | 2/2007 | Wredenhagen | |
| 2007/0201560 A1* | 8/2007 | Segall | H04N 19/61 |
| | | | 375/240.24 |
| 2008/0253672 A1* | 10/2008 | Segall | H04N 19/105 |
| | | | 382/238 |
| 2008/0259216 A1 | 10/2008 | Yoshida | |
| 2008/0297460 A1* | 12/2008 | Peng | G09G 3/3426 |
| | | | 345/102 |
| 2009/0027545 A1* | 1/2009 | Yeo | G06T 5/009 |
| | | | 348/362 |
| 2009/0046207 A1* | 2/2009 | Salvucci | G06T 9/001 |
| | | | 348/663 |
| 2010/0172411 A1* | 7/2010 | Efremov | H04N 19/136 |
| | | | 375/240.12 |
| 2011/0128438 A1 | 6/2011 | Yamashita | |
| 2013/0121572 A1* | 5/2013 | Paris | H04N 19/30 |
| | | | 382/166 |

OTHER PUBLICATIONS

Mantiuk, R. et al "Backward Compatible High Dynamic Range MPEG Video Compression" Jul. 1, 2006, Proc. SIGGRAPH, New York, USA, vol. 25, Issue 3.

Anonymous: "xvYCC Extended-Gamut Color Space for Video Applications" Aug. 10, 2011.

Wikipedia: "xvYCC" wikipedia.org XP-002691394, Jan. 10, 2011.

Matsumoto, T. et al "19.2: xvYCC: A New Standard for Video Systems Using Extended-Gamut YCC Color Space" 2006 SID International Symposium, Society for Information Display, vol. XXXVII, May 24, 2005 pp. 1130-1133.

Anonymous: "Color Management" Wikipedia.org, Sep. 1, 2011, XP002691395.

IEC 61966-2-4 Ed. 1.0 en:2006, Multimedia Systems and Equipment—Colour Measurement and Management—Part 2-4: Colour Management—Extended-gamut YCC colour space for video applications—xvYCC.

* cited by examiner

US 9,451,292 B2

METHOD AND SYSTEM FOR BACKWARD COMPATIBLE, EXTENDED DYNAMIC RANGE ENCODING OF VIDEO

CROSS-REFERENCE TO RELATED APPLICATIONS

This application claims priority to U.S. Provisional Patent Application No. 61/535,251 filed 15 Sep. 2011, which is hereby incorporated by reference in its entirety.

FIELD OF THE INVENTION

The invention pertains to methods and systems for backward compatible signaling of extended dynamic range (EDR) video over existing infrastructure for standard dynamic range (SDR) video. Other aspects of the invention are systems and methods for displaying such EDR video.

BACKGROUND OF THE INVENTION

Throughout this disclosure including in the claims, the expression performing an operation "on" signals or data (e.g., filtering, scaling, or transforming the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the noun "display" and the expression "display system" are used as synonyms.

Throughout this disclosure, the expression "encoding" of video (e.g., a video channel) denotes mapping a sequence of samples of the video to a set of values ("code values") indicative of displayed intensities in a range from a minimum intensity (black level) to a maximum intensity, where each of the code values determines a displayed intensity of a pixel (or a color component of a pixel, or a luminance or chroma value of a pixel, or another pixel component) when the encoded video is displayed. For example, a video channel may be encoded in a linear manner (so that the code values of the encoded video channel are linearly related to displayed intensity values) or a nonlinear manner (so that the code values of the encoded video channel are nonlinearly related to displayed intensity values).

Throughout this disclosure including in the claims, the expression "encoded video" denotes video determined by one or more channels of code values, each of the channels comprising a sequence of code values. For example, conventional Rec. 709 RGB video is encoded video comprising three channels of code values: a red channel comprising a sequence of red (R) code values (red color component values), a green channel comprising a sequence of green (G) code values (green color component values), and a blue channel comprising a sequence of blue (B) code values (blue color component values). For another example, conventional YCrCb video is encoded video comprising three channels of code values: a Y channel comprising a sequence of luminance or luma code values (e.g., luminance code values (Y), each of which is a weighted sum of linear R, G, and B color components, or luma code values (Y), each of which is a weighted sum of gamma-compressed R', G', and B' color components), a Cr channel comprising a sequence of Cr (chroma) code values, and a Cb channel comprising a sequence of Cb (chroma) code values.

Throughout this disclosure, the expression "white level" denotes the smallest code value (of a channel of encoded video) indicative of a pixel or pixel component (e.g., a color component of a pixel, or a luminance or chroma value of a pixel) having maximum displayed intensity when the encoded video is displayed (assuming that the displayed pixels are determined by code values of the channel that include the entire range of code values available for said channel, and code values of any other channel that determine the displayed pixels are identical for all the displayed pixels). To display the encoded video channel, a video system may map to the maximum displayed intensity (e.g., clip or compress to the maximum displayed intensity) any code values of the channel that are larger than the white level.

Throughout this disclosure, the expression "black level" denotes the largest code value (of a channel of encoded video) indicative of a pixel or pixel component (e.g., a color component of a pixel, or a luminance or chroma value of a pixel) having minimum displayed intensity when the encoded video is displayed (assuming that the displayed pixels are determined by code values of the channel that include the entire range of code values available for said channel, and code values of any other channel that determine the displayed pixels are identical for all the displayed pixels). To display the encoded video channel, a video system may map (e.g., clip or compress), to the minimum displayed intensity, any code values of the channel that are smaller than the black level.

Throughout this disclosure, the expression "standard dynamic range" or "SDR" (or "low dynamic range" or "LDR") channel denotes a channel of encoded video (e.g., a channel of a video signal indicative of encoded video data) having bit depth equal to N (e.g., N=8), where the code values available for the channel are in a range from a black level, X (referred to herein as a "standard black level"), to a white level, Z (referred to herein as a "standard white level"), where $0<X<Z<2^N-1$.

Throughout this disclosure, the expression "standard dynamic range" (or "SDR" or "low dynamic range" or "LDR") video denotes encoded video (e.g., encoded video data or a video signal indicative of encoded video data) having at least one SDR channel.

Throughout this disclosure including in the claims, the expression "standard dynamic range" (or "SDR" or "low dynamic range" or "LDR") video system denotes a system configured to display, in response to SDR video, an image sequence (or image) whose luminance (or luma or intensity) has a dynamic range (sometimes referred to herein as a standard dynamic range). Thus, when an SDR video system displays an image sequence in response to SDR video indicative of a set of encoded video data having an SDR channel, there is at least one value in the range from 0 to X that is not used as a code value of the SDR channel, and there is at least one value in the range from Z to $2^N-1$ that is not used as a code value of the SDR channel.

Throughout this disclosure, the expression "extended dynamic range" (or "EDR") channel denotes a channel of encoded video (e.g., a channel of a video signal indicative of encoded video data) having bit depth equal to N, where the code values of the channel are in a range from a minimum value, Min, to a maximum value, Max, where $0 \leq Min < X < Z < Max \leq 2^N-1$, where X is a standard black level, and Z is a standard white level.

Throughout this disclosure, the expression "extended dynamic range" or "EDR" video (or "high dynamic range" or "HDR" video) denotes encoded video (e.g., encoded video data or a video signal indicative of encoded video data) having at least one EDR channel. An example of HDR video is "visual dynamic range" (VDR) video, which is video data (or a video signal) capable of being displayed by a display system with the full dynamic range perceivable by a human viewer under normal display viewing conditions.

Throughout this disclosure including in the claims, the expression "extended dynamic range" (or "EDR" or "high dynamic range" or "HDR") video system denotes a system configured to display, in response to SDR video including at least one SDR channel whose code values are in a range from a standard black level, X, to a standard white level, Z, where $0<X<Z<2^N-1$, an image sequence (or image) whose luminance (or luma or intensity) has a dynamic range (sometimes referred to herein as a standard dynamic range) and a standard precision (a number, Q, of quantized levels of luminance, luma, or intensity), where the system is also configured to display an image sequence (or image) whose luminance (or luma or intensity) has an extended dynamic range (greater than the standard dynamic range) and/or an increased precision (a number, Q', of quantized levels of luminance, luma, or intensity, where Q'>Q) in response to EDR video including at least one EDR channel whose code values include a set of standard code values (in the range from the standard black level, X, to the standard white level, Z) and an additional code value set, where the additional code value set consists of at least one code value in the range Min<X (where 0≤Min), and/or at least one code value in the range Z<Max (where Max≤$2^N$-1), where X is the standard black level, and Z is the standard white level. For example, one EDR video system may be configured to display an image sequence having an extended dynamic range in response to multi-channel EDR video all of whose channels (e.g., R, G, and B channels) are EDR channels, and to display an image sequence having a standard dynamic range in response to multi-channel SDR video all of whose channels (e.g., R, G, and B channels) are SDR channels corresponding to the EDR channels. For another example, another EDR video system may be configured to display an image sequence having an extended dynamic range in response to multi-channel EDR video including one channel (a "first" channel, e.g., a Y channel) which is an EDR channel and other channels which are SDR channels, and to display an image sequence having a standard dynamic range in response to multi-channel SDR video including one channel (corresponding to the EDR video's first channel) which is an SDR channel and other channels which are SDR channels corresponding to the EDR video's SDR channels.

Conventional standard dynamic range (SDR) video (having a bit depth equal to N) can be transmitted through and displayed by a conventional SDR video system. Typically, the bit depth N is equal to 8. One commonly used type of conventional SDR video system displays SDR video that is 8-bit YCbCr video data (i.e., each word of the YCbCr video transmitted to or through, and displayed by, the system comprises an 8-bit Y component, an 8-bit Cb component, and an 8-bit Cr component, where the Y channel determines signal luminance, and the Cb and Cr channels determine color information), with some space above white and below black reserved for signal overshoot and undershoot. In such conventional systems, the 8-bit luminance values from 1 to 254 are available for use (0 and 255 are typically illegal, and not available for use, because they are specifically used for video timing signals). However, the specified black level is typically code 16 (the code value 16 is considered to be the black level), and the specified white level is typically code 235 (the code value 235 is considered to be the white level), and code values (indicative of luminance) in the range from 1 to 15 and/or the range from 236-254 are not used to display images.

Cast into absolute units for a reference display, code 16 (in a conventional display system of the type mentioned in the previous paragraph which operates with 8 bit YCbCr video signals) represents about 0.01 cd/m² (0.01 candelas per square meter, where the unit "candelas per square meter" is sometimes referred to as "nits") and code 235 represents about 100 cd/m². The conventional signal encoding used to generate the coded luminance values in the range 16-235 is roughly a gamma 2.4 curve (power function with a 2.4 exponent) which approximates the human visual perception curve for this range of luminance.

Other conventional SDR video systems display SDR video that is 8-bit RGB video data, with 8-bit code values from 1 to 254 available for use in each color channel. In some implementations (or operating modes) of such systems, the specified black level of each color channel (R, G, or B) is code 16 (the code value 16 is considered to be the black level), the specified maximum level is code 235 (the code value 235 is considered to be the maximum level), and the code values in the range from 1 to 15 and the range from 236-254 are not used to display images.

The inventors have recognized that it would be desirable to utilize unused coding space of SDR video to encode EDR video that can be displayed with standard dynamic range and standard precision by SDR video systems and can be displayed with extended dynamic range and/or increased precision by EDR video systems.

BRIEF DESCRIPTION OF THE INVENTION

Typical embodiments of the invention enable signaling of extended dynamic range (EDR) video (which may be VDR video) over existing infrastructures for lower dynamic range (SDR) video. Typical embodiments provide a way to disseminate video having M-bit depth and wide dynamic range (e.g., the full dynamic range perceivable by a human viewer) through conventional infrastructure (e.g., DVD/Blu ray and broadcast TV systems) that supports SDR video systems configured to display SDR video having N-bit depth (where N is typically less than M. For example, in some cases, M=12 and N=8), by encoding the M-bit video as N-bit EDR video for dissemination. EDR video data having N-bit depth generated in accordance with typical embodiments of the invention can be transmitted through a legacy video infrastructure (configured to transmit and display SDR video having the same bit depth) in a backward compatible manner, can be displayed with standard dynamic range by SDR video systems configured to display conventional N-bit SDR video, and can be displayed with extended dynamic range (and/or increased precision) by EDR video systems. When displaying N-bit EDR video generated in accordance with the invention, there may be some loss of quality compared to the quality achievable with higher bit depth video (M-bit video, where M>N), but this limitation is offset by the advantage of complete backward compatibility provided by typical embodiments of the invention (in the sense that conventional infrastructure may not be able to disseminate the M-bit video whereas it can disseminate the inventive N-bit EDR video).

In a first class of embodiments, the invention is an encoding method including a step of generating an output EDR channel in response to an input video channel, such that the output EDR channel's code values consist of a set of N-bit, standard code values (in a range from a standard black level, X, through a standard white level, Z, where 1<X and Z<($2^N$–2)), and an additional code value set consisting of at least one N-bit code value in a range from Min to X (where Min is a value satisfying 1≤Min<X) and/or at least one code value in a range from Z to Max (where Max is a value satisfying Z<Max≤$2^N$–2). The output EDR channel is displayable (with a standard dynamic range and a standard precision) by an SDR video system which maps (e.g., clips or compresses) to the black level X any of the EDR channel's code values in the range from Min to X, and maps (e.g., clips or compresses) to the standard white level Z any of the EDR channel's code values in the range from Z to Max. The output EDR channel is also displayable, with an extended dynamic range greater than the standard dynamic range and/or a precision greater than the standard precision, by an EDR video system. Some embodiments generate an output EDR red channel of red (R) code values in response to the code values of the red (R) channel of RGB input video (e.g., conventional Rec. 709 RGB input video), an output EDR green channel of green (G) code values in response to the code values of the green channel of the input video, and an output EDR blue channel of blue (B) code values in response to the code values of the blue channel of the input video. Another exemplary embodiment of the method generates an EDR channel of luminance (Y) values in response to the code values of the luminance (Y) channel of conventional YCrCb input video.

In typical embodiments in the first class, the EDR channel code values in the range from Z (the standard white level) through Max are indicative of highlights (e.g., specular highlights and/or light sources) of at least one image determined by the input video, and the method includes a step of mapping input video values that exceed a threshold value to EDR channel code values in the range from Z through Max in accordance with a first transfer function, and mapping input video values that do not exceed the threshold value to EDR channel code values that do not exceed Z in accordance with a second transfer function which is steeper than the first transfer function. For example, when generating 8-bit EDR channel code values, the threshold value may be the input video value mapped to the EDR channel code value 235 and the inventive encoder may apply inverse gamma encoding (e.g., with γ=2.4) to input values to generate EDR code values in the range from 16 through 235, and log (base 2) encoding to larger input values (indicative of specular highlights and/or light sources) to generate EDR code values in the range extension from 236 through 254. In this way, a large dynamic range extension (e.g., on the order of 1000 cd/$m^2$) can be provided by only a few additional EDR code values (e.g., 19 code values). To display EDR video including the exemplary EDR channel, an SDR video system would map (e.g., clip) the EDR channel code values in the range 236 to 254 (above standard white level) to the value 235, and optionally also map (e.g., clip) any EDR channel code values in the range 1-15 (below standard black level) to the value 16.

In some embodiments in the first class, input video values below a second threshold value (the input video value mapped to the EDR channel code value L, where L is an integer greater than the standard black level) are mapped to EDR channel code values in the range from 1 to L, to provide more precision at the bottom end of the signal space. In some embodiments, L=2 W, where W is an integer (e.g., 2 W=32 in some embodiments in which the bit depth N is equal to 8). These embodiments allow the resulting EDR video (e.g., VDR video) to propagate through legacy SDR systems with minimal quality side effects, and also allow suitable EDR (e.g., VDR) video systems to use the extended dynamic range signaling to display the EDR video with more accurate blacks (an increased number of quantized levels of luminance, luma, or intensity, near the black level) and brighter highlights.

In another class of embodiments, the invention is an encoding system configured to perform any embodiment of the inventive encoding method.

In some embodiments, the invention is a method for displaying EDR video, wherein the EDR video has at least one EDR channel whose code values consist of a set of standard code values and an additional code value set, wherein the standard code values are N-bit values in a range from a standard black level, X, through a standard white level, Z, where 1<X and Z<($2^N$–2)), and the additional code value set consists of at least N-bit one code value in the range from Min to X (where Min is a value satisfying 1≤Min<X) and/or at least one N-bit code value in the range from Z to Max (where Max is a value satisfying Z<Max≤$2^N$–2), wherein the EDR video is displayable with a standard dynamic range and a standard precision by an SDR video system which maps (e.g., clips or compresses) to the black level X any of the code values in the additional code value set in the range from Min to X, and maps (e.g., clips or compresses) to the standard white level Z any of the code values in the additional code value set in the range from Z to Max, said method including a step of: (a) in response to the EDR video, displaying at least one image having an extended dynamic range and/or increased precision, where the extended dynamic range is greater than the standard dynamic range and the increased precision is greater than the standard precision. In some embodiments, the method also includes a step of: (b) in response to the EDR video, employing an SDR video system to display at least one image having the standard dynamic range and the standard precision, including by mapping to the black level X any of the code values in the additional code value set in the range from Min to X, and mapping to the standard white level Z any of the code values in the additional code value set in the range from Z to Max.

In another class of embodiments, the invention is a system configured to perform any embodiment of the inventive method for displaying EDR video. For example, one such system includes an EDR video system coupled to receive the EDR video and configured to perform step (a) in response to the EDR video, and an SDR video system coupled to receive the EDR video and configured to perform step (b) in response to the EDR video.

Encoding of input video in accordance with the invention to generate an EDR channel in response to an input video channel, such that the output EDR channel's code values consist of a set of N-bit, standard code values (in a range from a standard black level, X, through a standard white level, Z, where 1<X and Z<($2^N$–2)), and an additional code value set, can be performed in any of a variety of ways. For example, it can be accomplished by using look up tables (predefined or determined by metadata transmitted or otherwise provided with the input video) or by using a predetermined formula whose parameters can optionally be changed by metadata transmitted or otherwise provided with the input video.

In accordance with some embodiments of the invention, digital code values in the range 7 from 1 to 15 and/or the range from 236-254 that are unused in conventionally encoded 8-bit video data are used to indicate wider dynamic range (and/or greater precision) image data. Some such embodiments use code values from 236 to 254 to provide a dynamic range extension of from about 100 cd/m² to about 1000 cd/m² (or 2000 cd/m²) beyond the standard dynamic range provided by conventional encoding (e.g., inverse gamma encoding) of input video values to code values in the range from 16 to 235. Typical embodiments prevent the extreme luminance (or intensity) steps required to cover a large range extension (e.g., of on the order of 1000 cd/m²) with only a small number (e.g., 19) additional code words from causing gross artifacts (e.g., banding) when the encoded EDR video is displayed, by using the luminance (or intensity) dynamic range extension provided in accordance with the invention only to encode highlights (e.g., specular highlights and/or light sources) in each image determined by the input video. This is implemented by including in the inventive encoding method a step of mapping the bulk of the input video values to EDR video code values in the standard 16-235 range (in accordance with first transfer function, e.g., an inverse gamma encoding function), and mapping (in accordance with a less steep transfer function, e.g., a log function) only high luminance (or high intensity) input values (indicative of specular highlights and light sources) to code values in the range from 236 to 254. Thus, the EDR video would look much the same when displayed by an EDR video system as conventional SDR video (generated by encoding the same input video but in a conventional manner using only code values 16-235, including by mapping high intensity input values to the standard white level of 235) would look if displayed by a conventional (legacy) SDR display which clips the EDR video code values above 235 to the standard white level of 235, except that the displayed EDR video would have brighter highlights. The data of the inventive EDR video signal in the 236-254 code value range would typically be clipped or compressed by conventional legacy systems, resulting in the crushing of detail (and limited brightness for the specular highlight and light source features) that is also common in today's SDR video signals. However, if the inventive EDR signal is used for producing a display by an EDR (e.g., new generation high dynamic range) video system, the higher code values (in the range 236-154) can be displayed at their full intended intensity giving the greater sense of realism that comes with higher dynamic range.

In accordance with some embodiments of the invention, digital code values in the range from 1 to 15 ("below black" codes) that are unused in conventionally encoded 8-bit video data are used to represent greater precision image data at the bottom range of the signal space. Gamma signals (e.g., conventional inverse gamma encoded code values 16-235) are at their weakest at the lowest levels, where their quantization step sizes can begin to exceed human visual JNDs. This can result in banding artifacts at very low levels of luminance. In encoding in accordance with some embodiments of the invention, extra "below black" codes are used to insert half (or other fractional) steps in between the normal quantization (e.g., gamma quantization) steps for the lowest range of legacy code values (e.g., 16-31). For example, code 15 is used to encode an input video value midway between the levels that are encoded by codes 16 and 17, code 14 is used to encode an input video value midway between the levels of codes 17 and 18, and so on. The "below black" encoded levels (those encoded by code values 1-15) are put in reverse order (the "below black" codes farthest below code 16 represent input values farthest above the value represented by code 16) to minimize the interaction of legacy filtering operations with the newly utilized signal levels. EDR video systems configured to utilize the inventive "below black" code values would display video (having luminance or intensity near to black level) with quantization steps that are less than (e.g., half the size of) those provided by legacy SDR systems that do not utilize "below black" code values. Because the performance of legacy SDR systems that display EDR video encoded with such embodiments of the invention would be slightly degraded in that they would display black bands in between very low quantization levels (e.g., those determined by code values in the range 16-31), there is a tradeoff to encoding input video using "below black" code values in accordance with some embodiments of the invention (in the sense that the performance of legacy SDR systems that display video encoded with such embodiments of the invention would be slightly degraded to enable high dynamic range systems to display the same encoded video with more precision). In contrast, legacy SDR systems would not suffer performance degradation when displaying EDR video encoded in accordance with embodiments of the invention that include "above white" code values, but not "below black" code values, in the EDR video.

Some embodiments of the invention encode input video having bit depth, N, that is not equal to 8 (e.g., input video having 10-bit depth or 12-bit depth). Assuming that N is greater than 8, the N-bit EDR video resulting from such embodiments would improve performance because a legacy SDR system (configured to display SDR video having the same N-bit depth) has greater precision than a legacy SDR system (configured to display SDR video having 8-bit depth) to start with, and the inventive encoding would make available (to EDR video systems configured to display video having the N-bit depth) more code values in the range extension at the top end of the luminance (or intensity) range, and/or provide precision improvement at the bottom end of the luminance (or intensity) range. For example, to generate 10-bit EDR video that is compatible with legacy 10-bit gamma systems that utilize only codes 64-940, some embodiments of the invention include code values 941-1019 and/or code values 4-63 in the EDR video, using code values 941-1019 for brightness extension and codes 4-63 dark precision enhancement. Some embodiments of the inventive encoding would provide more than one extra step in luminance (or intensity) in between the legacy steps at the dark end of the scale if desired (e.g., codes 62 and 63 of the inventive EDR video would represent two steps in between the steps represented by codes 64 and 65, in some embodiments).

Other aspects of the invention are a processor configured to perform any embodiment of the inventive encoding method, an encoder configured to perform any embodiment of the inventive encoding method, a system including such a processor (or encoder) and one or more of a capture subsystem for generating input video (to be encoded in accordance with the invention), a delivery subsystem configured to store and/or transmit an encoded representation of input video generated in accordance with the invention, and a display subsystem for displaying EDR video generated in accordance with the invention.

Embodiments of the inventive processor and encoder are (or include) a general or special purpose processor (e.g., a digital signal processor or microprocessor implemented as an integrated circuit (chip) or chip set) which is programmed with software (or firmware) and/or otherwise configured to perform an embodiment of the inventive method. Another aspect of the invention is a computer readable medium (e.g., a disc) which stores code for programming a processor to implement any embodiment of the inventive method.

DETAILED DESCRIPTION OF EMBODIMENTS

Figure 1:
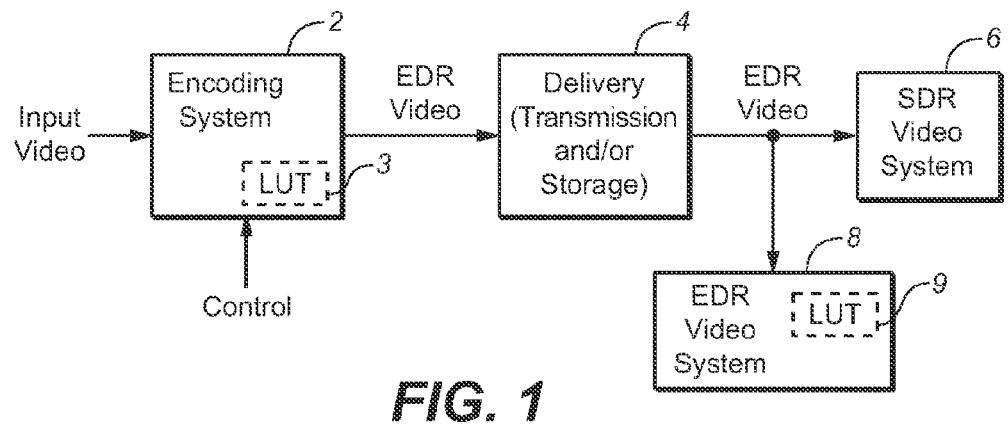
FIG. 1 is a block diagram of an embodiment of the inventive system.

The system of FIG. 1 includes encoder (encoding system) 2, which is configured to perform an embodiment of the inventive encoding method to generate EDR video (including at least one N-bit EDR channel) in response to input video (typically, M-bit input video, where M is greater than N). The input video may consist of a single channel (e.g., a single stream of M-bit color component values) or may comprise two or more channels (e.g., it may include a red channel which is a sequence of red (R) color component values, a green channel which is a sequence of green (G) color component values, and a blue channel which is a sequence of blue (B) color component values, or it may include a Y channel comprising a sequence of luminance or luma values, a Cr channel comprising a sequence of Cr (chroma) values, and a Cb channel comprising a sequence of Cb (chroma) values). In various implementations of the FIG. 1 system, encoder 2 is configured to perform any embodiment of the inventive encoding method to generate the EDR video. Examples of such embodiments of the inventive encoding method will be described below.

The EDR video generated in encoder 2 is provided via delivery subsystem 4 to SDR video system 6 and EDR video system 8 (and optionally also to other video systems). The EDR video may be stored by subsystem 4 (e.g., in the form of a DVD or Blu ray disc), or transmitted by subsystem (which may implement a transmission link or network), or may be both stored and transmitted by subsystem 4.

Delivery subsystem 4 includes (and preferably consists of) conventional infrastructure (e.g., DVD/Blu ray transmission or storage systems, and/or broadcast TV systems) that supports SDR video systems (e.g., system 6) configured to display SDR video having N-bit depth. EDR video (having a bit depth equal to N) generated by encoder 2 in accordance with the invention is delivered by (transmitted through and/or stored in) subsystem 4 in a backward compatible manner in the sense that a conventional implementation of subsystem 4 configured to deliver N-bit SDR video (e.g., a conventional SDR infrastructure) can deliver the EDR video. The EDR video delivered by subsystem 4 to SDR video system 6 is displayed with standard dynamic range and standard precision by system 6. The EDR video delivered to EDR video system 8 is displayed with extended dynamic range (and/or increased precision) by system 8. When system 8 displays the N-bit EDR video, there may be some loss of quality compared to the quality achievable with higher bit depth video (M-bit video, where M>N), but this limitation is offset by the advantage of complete backward compatibility provided by the invention (e.g., delivery subsystem 4, implemented as a conventional infrastructure, may not be able to disseminate M-bit video whereas it can disseminate the N-bit EDR video generated in accordance with the invention).

Encoder 2 is configured to perform any embodiment of the inventive encoding method to generate at least one output EDR channel in response to at least one channel of the input video, such that the output EDR channel's code values consist of a set of N-bit, standard code values (in a range from a standard black level, X, through a standard white level, Z, where 1<X and Z<($2^N$−2)), and an additional code value set consisting of at least one N-bit code value in the range from Min to X (where Min is a value satisfying 1≤Min<X) and/or at least one code value in the range from Z to Max (where Max is a value satisfying Z<Max≤$2^N$−2). The output EDR channel is displayable (with a standard dynamic range and a standard precision) by SDR video system 6, provided that system 6 is configured to map (e.g., clip or compress) to the black level X any of the EDR channel's code values in the range from Min to X, and to map (e.g., clip or compress) to the standard white level Z any of the EDR channel's code values in the range from Z to Max. The output EDR channel is also displayable (with an extended dynamic range greater than the standard dynamic range and/or a precision greater than the standard precision) by EDR video system 8.

For example, if the input video is RGB video (e.g., conventional Rec. 709 RGB video), one implementation of encoder 2 generates an output EDR red channel of red (R) code values in response to the code values of the red channel of the input video, generates an output EDR green channel of green (G) code values in response to the code values of the green channel of the input video, and generates an output EDR blue channel of blue (B) code values in response to the code values of the blue channel of the input video. For another example, if the input video is conventional YCrCb video, one implementation of encoder 2 generates an output EDR channel of luminance (Y) values in response to the code values of the luminance (Y) channel of the input video.

In typical embodiments, encoder 2 is configured to perform any embodiment of the inventive encoding method to generate each EDR channel such that the code values in the EDR channel in the range from Z (the standard white level) through Max are indicative of highlights of at least one image determined by the EDR channel (where the highlights are in turn determined by highlights of at least one image determined by the input video). The method includes a step of mapping input video values that exceed a threshold value to the EDR channel code values in the range from Z through Max. For example, in some such embodiments in which the EDR channel is 8-bit YCbCr video, the threshold value is the input video value that is mapped to the EDR channel code value 235, and input video values that exceed the threshold value are mapped to EDR channel code values in the range from 236 through 254. To display EDR video including the EDR channel, SDR video system 6 would map (e.g., clip) the EDR channel code values in the range 236 to 254 (above standard white level) to the value 235, and optionally also map (e.g., clip) any EDR channel code values in the range 1-15 (below standard black level) to the value 16. These embodiments allow the EDR video to propagate through a legacy delivery system (subsystem 4 implemented as conventional SDR infrastructure) with minimal quality side effects, and also allow suitable EDR video systems (e.g., system 8) to use the extended dynamic range signaling to display brighter highlights.

In some embodiments, encoder 2 is configured to map input video values below a second threshold value (the input video value mapped to the EDR channel code value L, where L is an integer) to EDR channel code values in the range from 1 to L, to provide more precision at the bottom end of the signal space. In some embodiments, L=2W, where W is an integer (e.g., 2 W=32 in some embodiments in which the bit depth N is equal to 8). These embodiments allow the resulting EDR video to propagate through a legacy delivery system (subsystem 4 implemented as conventional SDR infrastructure) with minimal quality side effects, and also allow suitable EDR video systems (e.g., system 8) to use the extended dynamic range signaling to display more accurate blacks (an increased number of quantized levels of luminance, luma, or intensity, near the black level).

In some embodiments (e.g., embodiments implemented by EDR video system 8 of FIG. 1), the invention is a method for displaying EDR video, wherein the EDR video has at least one EDR channel whose code values consist of a set of standard code values and an additional code value set, wherein the standard code values are N-bit values in a range from a standard black level, X, through a standard white level, Z, where $1<X$ and $Z<(2^N-2)$), and the additional code value set consists of at least N-bit one code value in the range from Min to X (where Min is a value satisfying $1\leq Min<X$) and/or at least one N-bit code value in the range from Z to Max (where Max is a value satisfying $Z<Max\leq 2^N-2$), wherein the EDR video is displayable with a standard dynamic range and a standard precision by an SDR video system which maps (e.g., clips or compresses) to the black level X any of the code values in the additional code value set in the range from Min to X, and maps (e.g., clips or compresses) to the standard white level Z any of the code values in the additional code value set in the range from Z to Max. In these embodiments, the method includes a step of: (a) in response to the EDR video, displaying at least one image having an extended dynamic range and/or increased precision, where the extended dynamic range is greater than the standard dynamic range and the increased precision is greater than the standard precision. In some such embodiments (e.g., embodiments implemented by SDR video system 6 and EDR video system 8, the method also includes a step of: (b) in response to the EDR video, employing an SDR video system (e.g., system 6 of FIG. 1) to display at least one image having the standard dynamic range and the standard precision, including by mapping to the black level X any of the code values in the additional code value set in the range from Min to X, and mapping to the standard white level Z any of the code values in the additional code value set in the range from Z to Max.

Encoder 2 can perform encoding of input video in any of a variety of ways to generate an EDR channel (whose code values consist of a set of N-bit, standard code values in a range from standard black level, X, to standard white level, Z, where $1<X$ and $Z<(2^N-2)$, and an additional code value set) in accordance with the invention. For example, encoder 2 is optionally implemented to include one or more look up tables 3 (shown in phantom view in FIG. 1 to indicate that each look up table is optional) coupled and configured to output the EDR code values in response to input values. The look up tables may be predefined or determined by control data (e.g., metadata transmitted or otherwise provided with the input video). Alternatively, encoder 2 may be or include a processor that is programmed and/or otherwise configured to generate the code values of the EDR channel in response to the input values according to a predetermined formula. Optionally, parameters of the formula are changeable in response to control data (e.g., metadata transmitted or otherwise provided with the input video).

In accordance with some embodiments, an 8-bit EDR channel generated by encoder 2 uses digital code values in the range from 1 to 15 and/or the range from 236-254 (that are unused in conventionally encoded 8-bit video data) to represent wider dynamic range (or greater precision) image data. Some such embodiments use code values from 236 to 254 to provide a dynamic range extension (equal to the difference between the extended dynamic range and the standard dynamic range) of from about 100 cd/m² to about 1000 (or 2000) cd/m² beyond the standard dynamic range provided by conventional inverse gamma encoding of input video values to code values in the range from 16 to 235.

For example, in the case that the input video is linear input video data (e.g., standard linear Rec. 709 RGB data) comprising pixels, each pixel determined by a red (R) color component, a green (G) color component, and a blue (B) color component), encoding of the R, G, and B components of the input video can be performed as follows: encoder 2 applies inverse gamma encoding to each input value whose magnitude is greater than the standard black level but less than standard white level (e.g., the encoded version, $V_c$, of an input value $V_i$ in this range is proportional to $V_i^{1/\gamma}$, where $\gamma$ is typically equal to 2.4); and encoder 2 applies log encoding to each input value whose magnitude is greater than the standard white level (e.g., the encoded version, $V_c$, of input value $V_i$ in this range is proportional to $\log_2(V_i)$). Alternatively, encoding of another type is applied to each input value whose magnitude is less than a threshold ("near black") level that is greater (typically, slightly greater) than the standard black level.

Encoder 2 optionally includes one or more look up tables 3 (shown in phantom view in FIG. 1 to indicate that each look up table is optional) coupled and configured to output N-bit EDR code values in response to the M-bit input values. The look up tables may be predefined or determined by control data (e.g., metadata transmitted or otherwise provided with the input video). For example, such metadata may determine the gamma value, $\gamma$, for inverse gamma encoding to be applied to some of the input values. Alternatively, encoder 2 may be or include a processor that is programmed and/or otherwise configured to generate the N-bit code values in response to the input values according to a predetermined formula. Optionally, parameters of the formula are changeable in response to control data (e.g., metadata transmitted or otherwise provided with the input video). An EDR video system (e.g. system 8 of FIG. 1) would typically decode the EDR video delivered thereto (by performing the inverse of the encoding originally performed to generate the EDR video in response to input video) to reconstruct the input video, and then display the input video. The decoding may be implemented using one or more look up tables in the EDR video system (e.g., look up table 9 of system 8 of FIG. 1, shown in phantom view in FIG. 1 to indicate that the look up table is optional) coupled and configured to output M-bit input values in response to the N-bit EDR code values. The look up tables may be predefined or determined by control data (e.g., metadata delivered with the EDR video). For example, such metadata (which may be included by encoder 2 with the EDR video that it outputs to delivery subsystem 4) may determine the gamma value, $\gamma$, for gamma encoding to be applied to some of the EDR code values (e.g., a gamma value of 2.2 or 2.35, rather than 2.4), and/or a specific scaled log function to be applied to other ones of the EDR code values (e.g., those representing an extended top portion of the code value range). Alternatively, the metadata may determine another type of decoding to be performed on the EDR code values (e.g., a decoding method without a strict functional representation). The metadata may determine the inflection point (e.g., between gamma and log encoding) that was employed during encoding to generate the EDR code values, so that decoding can be performed with the corresponding inflection point (e.g., the inflection point may be a code value lower than 235, as it is in the 8-bit case described below, if the encoding implemented more quantization levels for the extended part of the range than does the encoding described in the paragraph below, at the cost of sacrificing some additional compression artifacts in the near white part (from 215 to 235) of the full (16 to 235) SDR range. For example, the inflection point could be at 215 instead of 235, which would cause extra compression in the "near white" EDR code values from 215 to 235. Many cameras implement this same type of compression, and it is considered acceptable under many circumstances). Rather than in one or more look up tables, the decoding may alternatively be implemented by a processor included in the EDR video system. The processor may be preprogrammed (or otherwise preconfigured) to perform the decoding, or the processor may be programmed (or otherwise configured) in response to metadata delivered with the EDR video.

What follows is exemplary Matlab code which determines an encoding transfer function of the type described earlier (inverse gamma encoding for normalized input values below 1, and log encoding for normalized input values above 1, where the input values are normalized such that the standard (reference) white level is the value "1") for generating a red EDR channel in response to the red channel of normalized standard linear Rec. 709 RGB input video:

NormalizedCodeMax=((254−235)/(235−16))+1;

SDR$pR$=Lin709$R$;

SDR$pR$(SDR$pR$>=0)=SDR$pR$(SDR$pR$>=0).^(1/2.4);

SDR$pR$(SDR$pR$>1)=(log 2(SDR$pR$(SDR$pR$>1))/log 2(PeakLinear))*(NormalizedCodeMax−1)+1, where Lin709R is the red channel of a normalized linear representation of the linear Rec. 709 RGB input video (in Rec. 709 color space), with the values of Lin709R ranging from 0 through PeakLinear. This range, from 0 to PeakLinear, includes the normalized value 1 which corresponds to a typical SDR reference white value (e.g., 100 cd/m$^2$). PeakLinear (typically chosen to be 10) corresponds to the maximum value of the input video that can be represented (e.g., 1000 cd/m$^2$) in the normalized linear Rec. 709 space. Note that the Lin709R values will typically include many values>1 (e.g., for highlight details). As indicated, the value of NormalizedCodeMax is approximately equal to 2.087 (=1.087+1).

Figure 2:
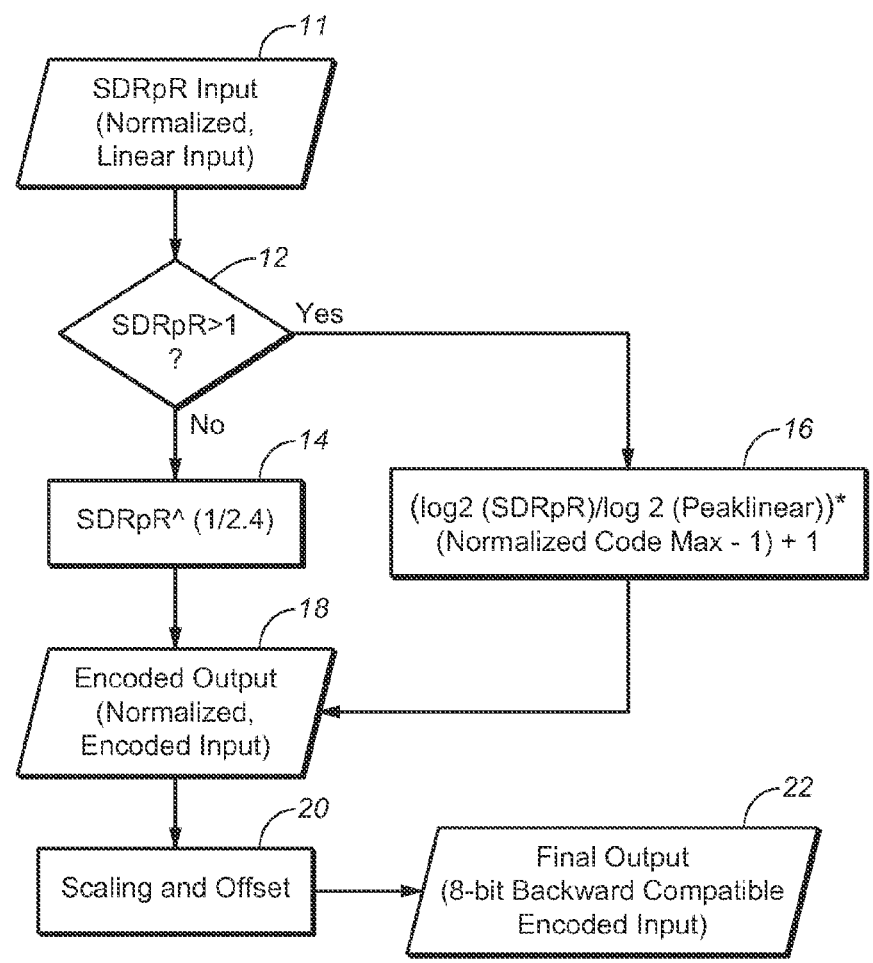
FIG. 2 is a flow chart of an embodiment of the inventive encoding method.

FIG. 2 is a flow chart of an embodiment of the inventive encoding method of the type described in the previous paragraph. In FIG. 2, the video to be encoded (SDRpR video 11) is a sequence of values of a channel of a normalized linear representation of linear, M-bit input video (e.g., SDRpR video 11 is a red channel of normalized linear Rec. 709 RGB input video. Step 12 determines whether each SDRpR value 11 in the sequence is greater than 1. If the SDRpR value is not greater than 1 (i.e., if it corresponds to an input value less than a SDR reference white value), then step 14 is performed to apply inverse gamma correction thereto (e.g., with gamma value, γ, equal to 2.4 as shown in FIG. 2, or another gamma value). If the SDRpR value is greater than 1 (i.e., if it corresponds to an input value equal to or greater than the SDR reference white value), then step 16 is performed to apply log encoding thereto (e.g., SDRpR is replaced by (log 2(SDRpR)/log 2(PeakLinear))*(NormalizedCodeMax−1)+1. The outputs of steps 14 and 16 are time-division-multiplexed to generate a sequence of code values 18 (encoded output values 18), each of which is a normalized, encoded version of a corresponding input video value. In step 20, scaling and/or offset operations are performed on each of values 18 to generate a sequence of final output values 22 (an encoded EDR channel). In the case that each code value 18 is an 8-bit code value, step 20 typically includes scaling (e.g., by the factor (254−16)) and offset (e.g. addition of the offset value 16) operations on the code values 18, to ensure that each of the values 22 of the encoded EDR channel is an 8-bit code value in the range from 16 through 254. Such output EDR channel is displayable (with a standard dynamic range) by an SDR video system which maps (e.g., clips or compresses) to the reference (standard) white level any of the EDR channel's code values in the range from 236 to 254. An EDR video system can perform a decoding operation (the inverse of that described with reference to FIG. 2) on the values 22 to recover the original SDRpR values 11, and typically also an inverse normalization operation on the values 11 to recover the original M-bit input video (which was normalized to generate values 11 of FIG. 2), and can then display the recovered M-bit input video (or SDRpR values 11) with an enhanced dynamic range.

Typical embodiments (including the embodiment described in the four previous paragraphs) prevent the extreme luminance (or intensity) steps required to cover the dynamic range extension provided by the invention (e.g., a large dynamic range extension of on the order of 1000 cd/m2) with only a small number of additional code words (e.g., nineteen code words, namely the code words 236 through 254) from causing gross artifacts (e.g., banding) when the encoded EDR video is displayed, by using the dynamic range extension provided in accordance with the invention only to encode any highlights (e.g., specular highlights and/or light sources) in each image determined by the input video data. In the exemplary embodiment, the encoding (in accordance with the relatively less steep, log (base 2), transfer function applied to the larger input values indicative of specular highlights and/or light sources to generate EDR code values in the range extension from 236 through 254 provides a large dynamic range extension (on the order of 1000 cd/m2) using only a small number of additional EDR code values. The bulk of the input video values are mapped to EDR video code values in the standard 16-235 range in accordance with the steeper, inverse gamma encoding function. To display EDR video including the exemplary EDR channel, an SDR video system would map (e.g., clip) the EDR channel code values in the range 236 to 254 (above standard white level) to the value 235, and optionally also map (e.g., clip) any EDR channel code values in the range 1-15 (below standard black level) to the value 16.

The EDR video would look much the same when displayed by an EDR video system as conventional SDR video (generated by encoding the same input video but in a conventional manner using only code values 16-235, including by mapping high intensity input values to the standard white level of 235) would look if displayed by a conventional (legacy) SDR display which clips the EDR video code values above 235 to the standard white level of 235, except that the displayed EDR video would have brighter highlights. The data of the inventive EDR video signal in the 236-254 code value range would typically be clipped or compressed by conventional legacy systems, resulting in the crushing of detail (and limited brightness for the specular highlight and light source features) that is also common in today's SDR video signals. However, if the inventive EDR video is used for producing a display by an EDR (e.g., new generation high dynamic range) video system, the higher code values (in the range 236-154) can be displayed at their full intended intensity giving the greater sense of realism that comes with higher dynamic range. Because specular highlights and light sources do not normally contain much texture anyway, the coarseness of quantization of luminance values in the 236-254 range of the inventive signal would not cause severe artifacts. Contributing to the absence of severe artifacts resulting from such use of the inventive EDR video signal is the fact that the viewer's visual adaptation will typically be set at a low level since the main part of the video signal (determined by code values in the range 16-235) will anchor the viewer's adaptation around 20 cd/m2 (typical video signal averages). It is well known that when adapted to a lower range, visual JNDs (just noticeable differences) are expanded at levels much higher (or much lower) than the adaptation level.

In accordance with some embodiments of the invention, digital code values in the range from 1 to 15 ("below black" codes) that are unused in conventionally encoded 8-bit video data are used to represent greater precision image data at the bottom range of the signal space. Gamma signals (e.g., conventional inverse gamma encoded code values 16-235) are at their weakest at the lowest levels, where their quantization step sizes can begin to exceed human visual JNDs. This can result in banding artifacts at very low levels of luminance. In encoding in accordance with some embodiments of the invention, encoder 2 employs extra "below black" code values to insert half (or other fractional) steps in between the quantization (e.g., gamma quantization) steps for the lowest range of standard code values (e.g., 16-31). For example, encoder 2 uses code 15 to encode an input video value midway between the levels it encodes using codes 16 and 17, encoder 2 uses code 14 to encode an input video value midway between the levels it encodes using codes 17 and 18, and so on. Encoder 2 places the "below black" encoded levels (those encoded by code values 1-15) in reverse order (in the sense that the "below black" codes farthest below code 16 represent input values farthest above the value represented by code 16) to minimize the interaction of legacy filtering operations with the newly utilized signal levels. EDR video system 8 is preferably configured to utilize the inventive "below black" code values to display video (having luminance or intensity near to black level) with quantization steps that are less than (e.g., half the size of) those provided by legacy SDR systems that do not utilize "below black" code values. Because the performance of legacy SDR systems (e.g., SDR video system 6) that display the EDR video encoded with such embodiments of the invention would be slightly degraded in that they would display black bands in between very low quantization levels (e.g., those determined by code values in the range 16-31), there is a tradeoff to encoding input video using "below black" code values in accordance with some embodiments of the invention (in the sense that the performance of legacy SDR systems that display video encoded with such embodiments of the invention would be slightly degraded to enable high dynamic range systems to display the same encoded video with more precision). In contrast, legacy SDR systems would not suffer performance degradation when displaying EDR video encoded in accordance with embodiments of the invention that include "above standard white" code values, but not "below black" code values, in the EDR video.

Consider an example in which encoder 2 (of FIG. 1) encodes input video in the manner described earlier, to generate code values in the range 16-254, and in which encoder 2 also implements encoding to generate "below black" code values 1-15 in response to input video values having very low level (i.e., having normalized levels in the range from SDRpR=4.576E-07 to approximately SDRpR=1.480E-03), where the code values 16-31 are mapped as shown in Table 1 (set forth below) to normalized SDRpR data:

TABLE 1

| SDRpR | $D = SDRpR^{1/(2.4)}$ | Code = D*(235 − 16) + 16 |
|---|---|---|
| 0 | 0 | 16 |
| 2.415E-06 | 0.004566 | 17 |
| 1.275E-05 | 0.009132 | 18 |
| 3.373E-05 | 0.013699 | 19 |
| 6.728E-05 | 0.018265 | 20 |
| 1.149E-04 | 0.022831 | 21 |
| 1.780E-04 | 0.027397 | 22 |
| 2.577E-04 | 0.031964 | 23 |
| 3.551E-04 | 0.03653 | 24 |
| 4.711E-04 | 0.041096 | 25 |
| 6.066E-04 | 0.045662 | 26 |
| 7.626E-04 | 0.050229 | 27 |
| 9.397E-04 | 0.054795 | 28 |
| 1.139E-03 | 0.059361 | 29 |
| 1.360E-03 | 0.063927 | 30 |
| 1.605E-03 | 0.068493 | 31 |

In accordance with the exemplary embodiment, digital code values in the range from 1 to 15 ("below black" codes) that are unused in conventionally encoded 8-bit video data are used to represent greater precision image data at the bottom range of the signal space. In the embodiment, encoder 2 employs extra "below black" code values to insert fractional steps in between the gamma quantization steps for the lowest range of standard code values (16-31). More specifically, encoder 2 may use "below black" code 15 to represent code value "16.5", which corresponds to SDRpR=4.576E-07 (with the mapping shown in Table 2 below). Likewise, "below black" code value 14 may be used to represent code value "17.5", which corresponds to SDRpR=6.391E-06, and so on for "below black" code values 1 through 13 (as shown in Table 2). To decode these "below black" code values 1-15, an EDR video system (e.g., system 8 of FIG. 1, including LUT 9) can be implemented to map (e.g., using LUT 9) each "below black" code value (1-15) to the corresponding normalized input value, thus implementing the inverse of the encoding process used to generate the "below black" code values. Table 2 (set forth below) shows such a decoding table that can be implemented by EDR video system 8 of FIG. 1:

TABLE 2

| Transmitted Code | Mapped Code | SDRpR |
|---|---|---|
| 1 | 30.5 | 1.480E-03 |
| 2 | 29.5 | 1.247E-03 |
| 3 | 28.5 | 1.036E-03 |
| 4 | 27.5 | 8.484E-04 |
| 5 | 26.5 | 6.820E-04 |
| 6 | 25.5 | 5.364E-04 |
| 7 | 24.5 | 4.107E-04 |
| 8 | 23.5 | 3.041E-04 |
| 9 | 22.5 | 2.157E-04 |
| 10 | 21.5 | 1.445E-04 |
| 11 | 20.5 | 8.926E-05 |
| 12 | 19.5 | 4.883E-05 |
| 13 | 18.5 | 2.178E-05 |
| 14 | 17.5 | 6.391E-06 |
| 15 | 16.5 | 4.576E-07 |

In response to metadata asserted to the EDR video system with the encoded video (e.g., metadata indicating the gamma value (equal to 2.4 in the example) that was employed to generate the encoded video), the EDR video system could configure LUT 9 (or select an appropriate LUT from a set of available LUTs) for use in decoding the encoded video.

In another embodiment, instead of using below black code values (e.g., EDR code values 1-15) for increased precision of coded values in the 16-31 coded range, those values are used to represent extended black levels. In this embodiment, instead of using a model of gamma that is a pure exponential function (e.g., $y=x^{gamma}$), it is preferable to use a model of gamma that is at least substantially similar to the one described the ITU recommendation known as ITU-R BT.EOTF, "Reference electro-optical transfer function (EOTF) for flat panel displays used in HDTV studio production," wherein $$y=\text{gain}*(x+\text{offset})^{gamma}, \quad (1)$$

where the offset and gamma values may be selected so that a reference code word for black (e.g., code 16) will result in a typical black level for consumer SDR HDTVs (e.g., 0.1 cd/m$^2$). In the embodiment, the inventive encoder would apply inverse gamma encoding (in accordance with the preferred model of gamma) to input values to generate EDR code values in the range from 1 through 235, and the EDR code values 1-15 would represent black levels below the typical black level (e.g., below 0.1 cd/m$^2$). Alternatively, one could use equation (1) to represent black levels above the typical black level, and use another function to represent black levels below the typical black level. To display video, in response to encoded video generated in accordance with the embodiment described in this paragraph, SDR displays could simply crush the black levels below the typical black level while EDR displays would display black levels with increased levels of gradation.

In some embodiments, encoder 2 is configured to encode input video having bit depth, N, that is not equal to 8 (e.g., input video having 10-bit depth or 12-bit depth). Assuming that N is greater than 8, the N-bit EDR video resulting from such embodiments would improve performance because a legacy SDR system (e.g., an implementation of system 6 configured to display SDR video having the same N-bit depth) has greater precision than a legacy SDR system (configured to display SDR video having 8-bit depth) to start with, and the inventive encoding would make available to EDR video systems (e.g., some implementations of system 8) configured to display video having the N-bit depth more code values in the range extension at the top end of the luminance (or intensity) range, and/or provide precision improvement at the bottom end of the luminance (or intensity) range. For example, to generate 10-bit EDR video that is compatible with legacy 10-bit gamma systems that utilize only codes 64-940, some embodiments of encoder 2 would include code values 941-1019 and/or code values 4-63 in the EDR video, using code values 941-1019 for brightness extension and codes 4-63 dark precision enhancement. Some embodiments of encoder 2 would provide more than one extra step in luminance (or intensity) in between the legacy steps at the dark end of the scale (e.g., some implementations of encoder 2 would use codes 62 and 63 of the 10-bit EDR video to represent two steps in between the steps represented by codes 64 and 65).

Some embodiments of the invention implement conventional xvYCC encoding concepts (e.g., encoding without clipping chroma value input signals that have normalized rec709 RGB representations below 0 or above 1), as well as extended luminance (or intensity) range encoding as described herein, to enable wide color gamut encoded content (as well as content having an extended dynamic range of luminance or intensity) to propagate through legacy systems. In these embodiments, the inventive encoding provides a means for sending signals having extended dynamic range luminance or intensity, and widened color gamut, through legacy video systems with complete backward compatibility. The well-known xvYCC color space permits YCC values that, while within the encoding range of YCC, have chroma values outside the range 16-240, or that correspond to negative RGB values, and hence would not have previously been valid. These are used to encode more saturated colors.

In other embodiments, encoding other than log encoding (e.g., perceptually based encoding) is applied to the above-threshold input values (e.g., to above-threshold input values that are indicative of specular highlights and/or light sources) to generate EDR code values in the range extension above the standard white level. For example, the above-described log-based transfer function for encoding the extended values (e.g., highlights) may be replaced by a more perceptually based curve or look-up table, based on the assumption that the viewer is adapted to lower levels of luminance. For example, the compression would get more severe than log as the levels increase toward the maximum. In some embodiments, dithering is applied during encoding of the EDR code values in a range extension indicative of "greater than standard white level" input values, e.g., to obscure any quantization artifacts that might be visible if dither were not added when encoding these values. An encoder may add dithering noise to the original highlight data and/or a decoder may add decontouring to the decoded highlight data to help mask any quantization artifacts that may otherwise be visible due to the limited number of transmitted coded values.

Other aspects of the invention are a processor configured to perform any embodiment of the inventive encoding method (e.g., encoder 2 of FIG. 1 implemented as a general or special purpose processor), an encoder (e.g., encoder 2 of FIG. 1) configured to perform any embodiment of the inventive encoding method, a system including such an encoder (or processor) and one or more of a capture subsystem for generating the input video (to be encoded in accordance with the invention), a delivery subsystem (e.g., delivery subsystem 4 of FIG. 1) configured to store and/or transmit an encoded representation of input video generated in accordance with the invention, and a display subsystem (e.g., EDR video system 8 and/or SDR video system 6 of FIG. 1) for displaying EDR video generated in accordance with the invention. Embodiments of the inventive processor and encoder are (or include) a general or special purpose processor (e.g., a digital signal processor or microprocessor implemented as an integrated circuit (chip) or chip set) which is programmed with software (or firmware) and/or otherwise configured to perform an embodiment of the inventive method. Another aspect of the invention is a computer readable medium (e.g., a disc) which stores code for programming a processor to implement any embodiment of the inventive method.

The present invention may suitably comprise, consist of, or consist essentially of, any of the steps and elements (the various parts and features of the invention) and their equivalents as described herein. Some embodiments of the present invention illustratively disclosed herein are practiced in the absence of one or more of the steps and elements described herein, whether or not this is specifically disclosed herein. Numerous modifications and variations of the present invention are possible in light of the above teachings. It is therefore to be understood that within the scope of the appended claims, the invention may be practiced otherwise than as specifically described herein.

The invention claimed is:

1. An encoding method, including a step of:
generating an extended dynamic range (EDR) channel in response to an input video channel, such that the EDR channel's code values consist of a set of N-bit, standard code values in a range from a standard black level, X, through a standard white level, Z, where 1<X and Z<($2^N$−2), and an additional code value set, wherein the EDR channel is displayable with a standard dynamic range and a standard precision by a standard dynamic range (SDR) video system which maps to the black level, X, any of the EDR channel's code values in the range from Min to X, and maps to the white level, Z, any of the EDR channel's code values in the range from Z to Max, where Min is a value satisfying 1≤Min<X and Max is a value satisfying Z>Max, wherein the EDR channel is also displayable, with at least one of an extended dynamic range greater than the standard dynamic range and a precision greater than the standard precision, by an EDR video system, wherein the input video channel is indicative of at least one image having highlights, and the EDR channel's code values greater than the standard white level, Z, are indicative of the highlights, wherein N=8, and wherein the step of generating the EDR channel in response to the input video channels includes steps of:
applying inverse gamma encoding to values of the input video channel to generate EDR channel code values in a range from 16 through 235; and
applying log encoding to values of the input video channel to generate EDR channel code values in a range extension from 236 through 254.

2. An encoding method, including a step of:
generating an extended dynamic range (EDR) channel in response to an input video channel, such that the EDR channel's code values consist of a set of N-bit, standard code values in a range from a standard black level, X, through a standard white level, Z, where 1<X and Z<($2^N$−2), and an additional code value set, wherein the EDR channel is displayable with a standard dynamic range and a standard precision by a standard dynamic range (SDR) video system which maps to the black level, X, any of the EDR channel's code values in the range from Min to X, and maps to the white level, Z, any of the EDR channel's code values in the range from Z to Max, where Min is a value satisfying 1≤Min<X and Max is a value satisfying Z>Max, wherein the EDR channel is also displayable, with at least one of an extended dynamic range greater than the standard dynamic range and a precision greater than the standard precision, by an EDR video system, and wherein the input video channel is indicative of at least one image having highlights, and the EDR channel's code values greater than the standard white level, Z, are indicative of the highlights, and wherein the step of generating the EDR channel in response to the input video channel includes steps of:
applying inverse gamma encoding to values of the input video channel to generate EDR channel code values in the range from the standard black level, X, to the standard white level, Z; and
applying log encoding to values of the input video channel to generate EDR channel code values in a range extension from the standard white level, Z, through Max.

3. The method of claim 2, also including a step of asserting the EDR channel and metadata to a delivery system, wherein the metadata is indicative of at least one parameter of at least one of the inverse gamma encoding and the log encoding.

4. The method of claim 2, wherein the EDR channel code values in the range extension from the standard white level, Z, through Max provide a dynamic range extension on the order of 1000 cd/m$^2$, wherein the dynamic range extension is the difference between the extended dynamic range and the standard dynamic range.

5. An encoding method, including a step of:
generating an extended dynamic range (EDR) channel in response to an input video channel, such that the EDR channel's code values consist of a set of N-bit, standard code values in a range from a standard black level, X, through a standard white level, Z, where 1<X and Z<($2^N$−2), and an additional code value set, wherein the EDR channel is displayable with a standard dynamic range and a standard precision by a standard dynamic range (SDR) video system which maps to the black level, X, any of the EDR channel's code values in the range from Min to X, and maps to the white level, Z, any of the EDR channel's code values in the range from Z to Max, where Min is a value satisfying 1≤Min<X and Max is a value satisfying Z>Max, wherein the EDR channel is also displayable, with at least one of an extended dynamic range greater than the standard dynamic range and a precision greater than the standard precision, by an EDR video system, wherein the input video is indicative of at least one image having highlights, and the EDR channel's code values greater than the standard white level, Z, are indicative of the highlights, and wherein the step of generating the EDR channel in response to the input video channel includes steps of:
mapping input video channel values that exceed a threshold value to EDR channel code values in the range from Z through Max in accordance with a first transfer function;
mapping input video channel values that do not exceed the threshold value to EDR channel code values that do not exceed Z in accordance with a second transfer function, wherein the second transfer function is steeper than the first transfer function, wherein N=8, and the threshold value is a value of the input video channel that is mapped to the EDR channel code value 235;
applying inverse gamma encoding to values of the input video channel to generate EDR channel code values in a range from 16 through 235; and
applying log encoding to values of the input video channel to generate EDR channel code values in a range extension from 236 through 254.

6. The method of claim 5, wherein the EDR channel code values in the range extension from 236 through 254 provide a dynamic range extension on the order of 1000 cd/m$^2$, wherein the dynamic range extension is the difference between the extended dynamic range and the standard dynamic range.

7. An encoding method, including a step of:
generating an extended dynamic range (EDR) channel in response to an input video channel, such that the EDR channel's code values consist of a set of N-bit, standard code values in a range from a standard black level, X, through a standard white level, Z, where 1<X and Z<($2^N$−2), and an additional code value set, wherein the EDR channel is displayable with a standard dynamic range and a standard precision by a standard dynamic range (SDR) video system which maps to the black level, X, any of the EDR channel's code values in the range from Min to X, and maps to the white level, Z, any of the EDR channel's code values in the range from Z to Max, where Min is a value satisfying 1≤Min<X and Max is a value satisfying Z>Max, wherein the EDR channel is also displayable, with at least one of an extended dynamic range greater than the standard dynamic range and a precision greater than the standard precision, by an EDR video system, wherein the step of generating the EDR channel in response to the input video channel includes a step of:

mapping input video channel values that are less than a threshold value to EDR channel code values in the range from 1 to L, so that the EDR channel is displayable, with a precision greater than the standard precision, by the EDR video system, wherein L is an integer greater than the standard black level, X, and the threshold value is the input video value that is mapped to the EDR channel code value L, wherein L=2W, where W is an integer, and wherein N=8, X=16, and L=2W=32.

\* \* \* \* \*